June 22, 1948. J. D. PRILLIMAN 2,443,930
ADJUSTING AND OPERATING TRUCK
FOR CAR END STRAIGHTENERS
Filed June 19, 1945 2 Sheets-Sheet 1
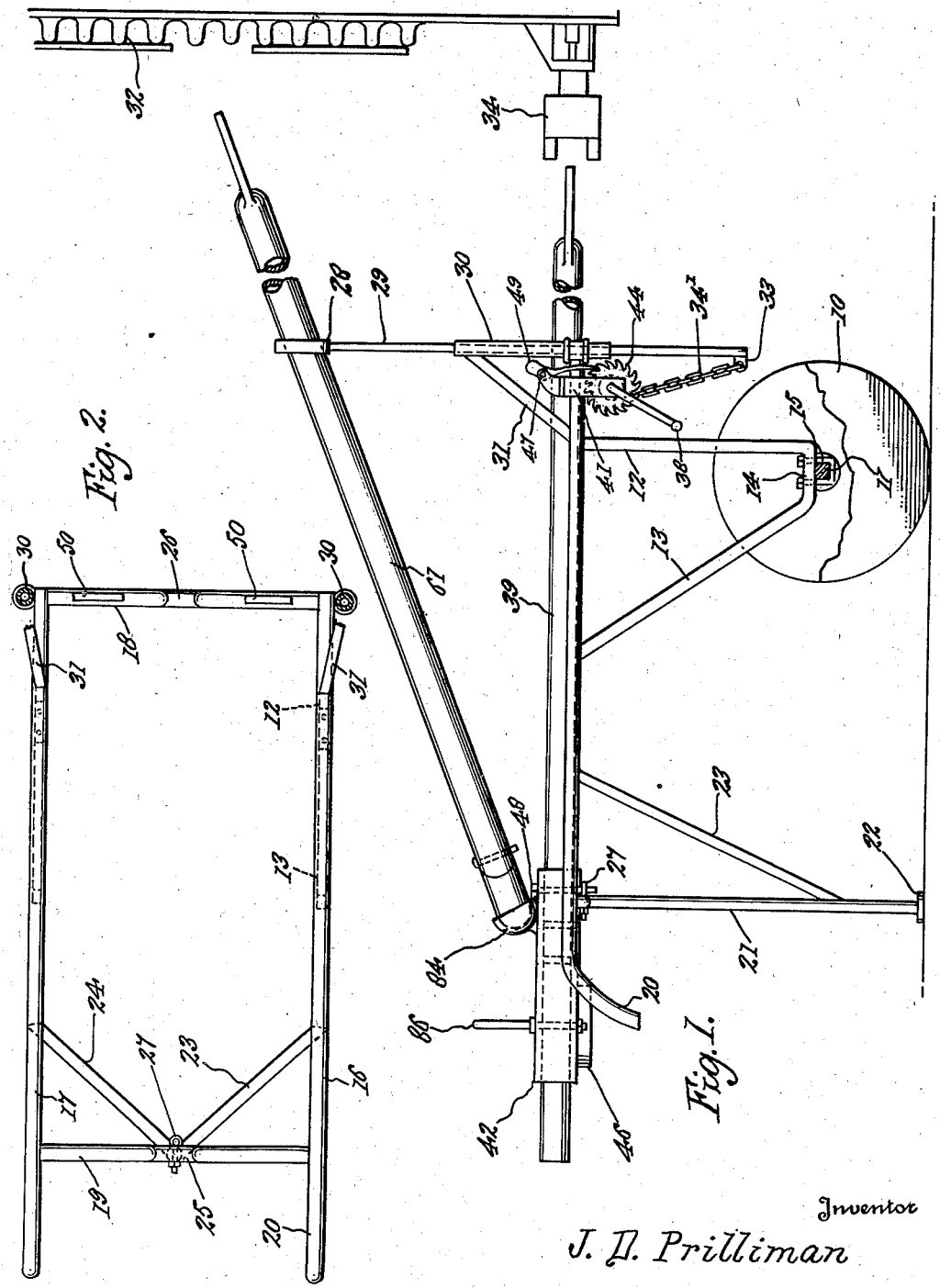
Inventor
J. D. Prilliman
By Mawhinney & Mawhinney
Attorneys June 22, 1948.   J. D. PRILLIMAN   2,443,930
ADJUSTING AND OPERATING TRUCK
FOR CAR END STRAIGHTENERS
Filed June 19, 1945   2 Sheets-Sheet 2
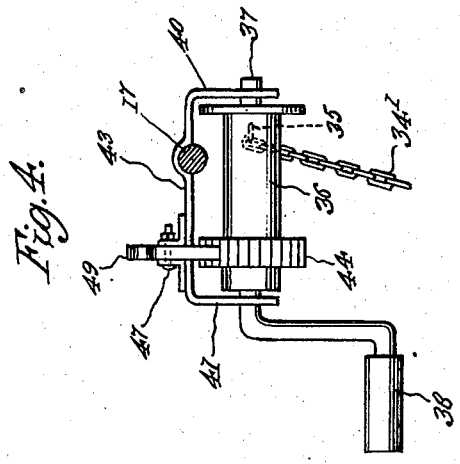
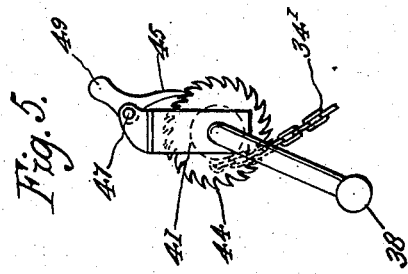
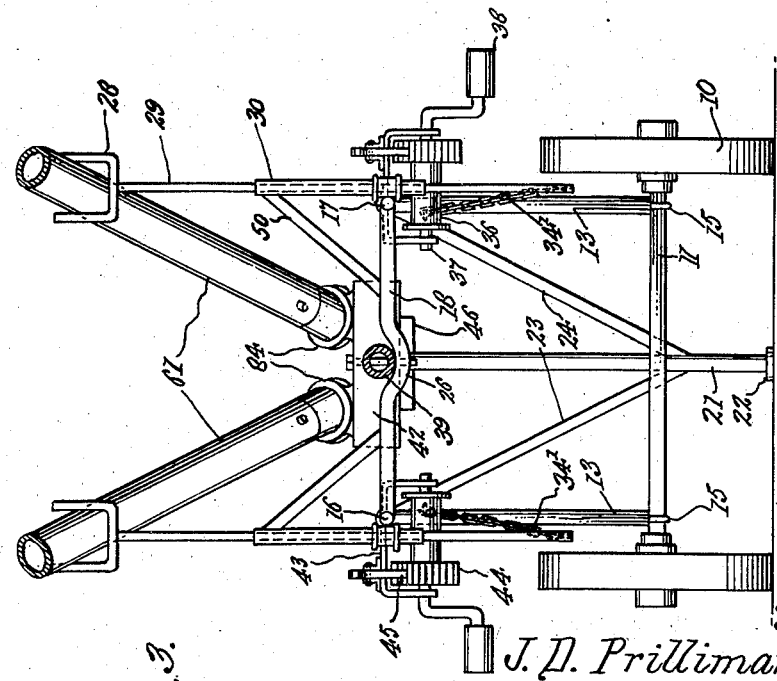
Inventor
J. D. Prilliman
By Mawhinney & Mawhinney
Attorneys Patented June 22, 1948

2,443,930

UNITED STATES PATENT OFFICE 2,443,930

ADJUSTING AND OPERATING TRUCK FOR CAR END STRAIGHTENERS

John D. Prilliman, Cincinnati, Ohio, assignor to Stobo Corporation, Wilmington, Del., a corporation of Delaware Application June 19, 1945, Serial No. 600,350

5 Claims. (Cl. 153—38)

The present invention relates to improvements in adjusting and operating truck for car end straightener and more particularly relates to a truck for receiving and supporting and initially operating the car end straightening device as illustrated and described in United States Patent No. 2,371,659, granted March 20, 1945, to Posy G. Stultz, assignor to Charles M. O'Boyle.

The primary purpose and aim of the present invention is to so construct and arrange a carrier for the Stultz car end straightener which will relieve the weight of that device from the crew of a minimum of two men required to convey the device to destination, to set it up and operate the same; and by use of the same carrier to enable the operation of that device by two men including the transportation of the device from place to place, to the end that much valuable labor is saved as well as time involved in the much quicker transportation of the device.

A further object of the invention resides in providing a truck especially constructed to receive the Stultz car end straightener in such a relation as to permit movement of the straightener into operative position against a car end and into position to be connected to the car coupler, and wherein adjusting means is provided for individually elevating and lowering the two compression arms of the Stultz straightener whereby the same may be brought to a desired local position against the car where bulges have occurred.

A still further object of the invention is to provide an improved truck for supporting the Stultz car end straightener in a manner to center the straightener and its tension arm with the compression arms of the straightener carried in individually and vertically adjustable supports, the invention also contemplating in more specific aspects novel constructions of movable supports and the guides therefor and of mechanism for raising and permitting the lowering of such compression arm supports.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevational view, with parts broken away and parts shown in section, of an improved adjusting and operating truck for car end straightener as constructed in accordance with the present invention, and shown as carrying a car end straightener in readiness to be applied to the end and coupler of a railway freight car, Figure 2 is a top plan view of the carriage with the straightener removed and the guide sleeves shown in section, Figure 3 is a front elevational view of the improved truck with parts of the straightener broken away and shown in section.

Figure 4 is an enlarged front view of one of the windlass devices with one of the frame rails of the truck shown in section, and Figure 5 is an end view taken from the left end of Figure 4.

Referring more particularly to the drawings, 39 designates the tension arm, and 61 the two compression arms of the form of car end straightener disclosed in the aforesaid patent. These arms are brought together in a jacking head 42, the lower central tension arm 39 being slidable through the jacking head 42 while the upper two compression arms 61 are received in universal sockets 84 of the jacking head which enables the compression arms 61 to be raised and lowered and to be moved together and apart angularly with respect to the head 42 and the lower tension arm 39.

In Figure 1 the compression arms 61 are shown as about to contact the end of a freight car 32 while the right hand end of the tension arm 39 is shown as about to be received into the car coupler 34, all in accordance with the patent aforesaid.

The present invention involves a truck for carrying such straightening device in which 10 designates the wheels and 11 the axle of the truck, which axle is connected to wheel brackets each composed of a vertical leg 12, a diagonal leg 13 and a horizontal shank or connecting portion 14, to which latter the axle 11 is directly secured as by the U-bolts 15. Two such wheel brackets are provided one at each side of the truck. The upper ends of the legs 12 and 13 are welded or otherwise secured to the side rails 16 and 17 of a rectangular or other frame which may be completed by the cross bars 18 and 19 which also may be welded or otherwise secured to the side rails 16, 17.

The rear ends of the side rails 16, 17 preferably terminate in the down-turned handles 20. A prop or leg 21 is welded or otherwise secured to a central portion of the rear cross bar 19 and has an appropriate foot 22 carried at its lower end having an ample area of contact with the ground. Braces 23, seen in Figure 1, may be connected between the lower end portion of the leg 21 and the side frames 16, 17, the parts all being preferably of metal and welded or otherwise secured together at their contacting portions.

Diagonal braces 24, seen in Figure 2, may be connected between the cross bar 19 and side rails 16, 17 of the truck frame. It will be obvious that any other bracing arrangement may be provided.

Depressions 25, 26 are made in the cross bars 19, 18 in a central portion and in alignment to receive therein the tension arm 39 of the straightener device in order to center this device upon the frame. Longitudinally the straightener device is shifted to a position determined by the bolt 48 in its relation to the loop or eye 27 which is welded or otherwise secured to the frame in a position just forward of the rear cross bar 19 to which the shank of the loop may be welded or otherwise connected.

Stirrups or other supports 28 are carried upon rods or pipes 29 which are vertically adjustable through guide sleeves 30. These guide sleeves are two in number and are carried upon the truck frame at forward portions of the same. The axes of these guide sleeves 30 are vertical or substantially so in order that the rods 29 and supports 28 may be adjusted vertically.

Braces 31 may be connected between upper portions of the sleeves 30 and the side rail 16, 17. These braces 31 are seen in Figure 1. In a similar way other braces 50, seen in Figure 3, may be connected between upper portions of the sleeves 30 and front cross bar 18.

The lower ends of the rods 29 are shown as equipped with perforated lugs 33 to receive the lower ends of chains 34. The upper ends of the chains are made fast, as indicated at 35 in Figure 4, to drums 36 rigidly mounted on spindles 37 rotatable by crank handles 38. The ends of the spindles 37 are rotatably supported in hangers 40, 41 depending from the yoke bars 43 which may be curved, as shown in Figure 4, to fit about the side rails of the truck frame to which they may be welded or otherwise secured.

Ratchet wheels 44 are made fast to the drums 36 and are engaged by pawls 45 pivoted at 47 in brackets carried by the yoke bars 43. The pawls 45 have weighted handles 49 so disposed with reference to the pivot points as to maintain the pawls 45 in engagement with the ratchet teeth until forcibly lifted out by manually engaging the handles 49.

In the use of the truck, the straightener device is initially mounted thereon as indicated in Figures 1 and 3 with the tension bar 39 occupying the depressions 25, 26 thus centering the device from a lateral aspect whereby the two upper compression arms 26 will be in position receivable into the forks or supports 28. The device is then adjusted longitudinally on the truck until the bolt 48 registers with the eye or loop 27 as shown in Figure 1.

This longitudinal position causes the straightener device to project at both ends from the truck. In other words the truck is so constructed and arranged as to be shorter than the straightening device. So constructed and with the straightener so centered longitudinally and laterally upon the truck, the forward end of the tension bar 39 and the front ends of the compression arms 61 are carried well in advance of the truck for engagement, without interference from the truck respectively with the car coupler 34 and the end wall 32 of the railway freight car, in a manner which is more fully set out in the patent aforesaid.

While it is not so important for the straightener device to extend to the left or rear end of the truck as shown in Figure 1, it is desirable that the jacking head 42 be out of the way of the rear cross bar 19 and that the socket 46 which receives the jack be exposed for this purpose without any conflict between jack and truck. The truck will support the device including the jacking head 42 while the jack is being placed beneath the same and the jack head fitted into the socket 46.

In fact the straightener device may remain on the truck throughout the jacking operation. After the straightening operation when the jack is lowered the straightener device will subside downwardly upon the truck through whatever distance it may have been elevated incident to the jacking operation.

An eye or hook 86 on the jack head 42 is designed to take the hook from a crane in case the crane is to be substituted for the jacking operation, all as disclosed in the prior patent aforesaid.

In applying the compression arms 61 to the car sheets 32, it is desirable to bring the operative ends of the arms 61 to a correct elevation which may be done by rotating the crank handles 38. By rotating these crank handles in one direction, for instance clockwise as viewed in Figure 1, the pawl 45 will ride out of the teeth due to the inclination thereof but its weight 49 will keep the pawl engaged with the teeth so that retrograde or counter-clockwise rotation is prevented. In this way the chain or cable 34 may be wound upon the drum to elevate the respective rod 29 and fork 28.

In case the fork 28 and respective compression arm 61 is to be lowered, the pawl is manually withdrawn from the ratchet by grasping the weighted handle 49 and rotating the pawl about the pivot 47. The weight of the compression arm 61 and of the other parts will cause these parts to descend paying out the chain 34.

The two windlass devices on opposite sides of the frame are independent so that the same may independently raise or lower the two compression arms 61 so as to bring their free ends into proper relative positions with local areas of the end car sheet 32.

The car end straightener may be permanently carried upon the truck, the truck being useful in moving the device up to the work. In as much as the device has only a very small movement through the jacking or crane operation, the straightener device will remain virtually upon the truck throughout the straightening operation.

The handles 20 are utilized to lift the leg 21 and to move the truck along on the two wheels 10 which is a comparatively easy task for two men.

The tread of the wheels 10 will be less than the standard guage between the rails to enable the device to be wheeled up to the end of the car in the manner indicated in Figure 1. The height of the truck will be such that when so positioned in Figure 1 the tension arm 39 will be level with the coupler 34. Thus the truck sustains the weight of the straightener device while the tension arm 39 is being joined to the coupler 34.

At the same time the supports or stirrups 28 sustain the weight of the compression arms 61 in the raised position in readiness to engage the end sheet 32 of the car. When the free ends of the compression arms 61 engage the car sheet 32 such compression arms 61 will be prevented from falling even though lightly engaged, which permits the stirrups 28 to be dropped out of the way, the compression arms 61 being then free to be moved laterally to assume the proper horizontal position against the sheet relatively to the bulge which is to be corrected.

The jack or crane then elevates the jacking head 42 with the result described in said patent, so that the bulged parts of the sheet are forced back into position. After the sheet 32 has been restored and set as by hammering with a sledge hammer, the jack is lowered and removed, the truck immediately taking up the suspension of the straightener device or so much of the weight thereof as may have been transferred to the jack or crane during the work operation.

The stirrups or supports 28 are thereupon run up by rotating the handles 38 and if the compression arms are not vertically above these stirrups or forks 28, they may be singly lifted over and laid in the respective forks 28. The tension bar 39 can then be disconnected from the coupler 34 and the truck wheeled away.

It will be understood that the improved truck may also move the car end straightener up to the side of the railway car or up to any other sheet or part which required straightening. In the case of a side of a car the tension arm may be connected thereto as shown in the patent aforesaid.

The truck is so constructed and arranged as to be counter-balanced when under the load of the car end straightener. This counter-balance results inherently from the construction of the truck whereby when the car end straightener is being moved about in the yards it is counter-balanced by the location of the wheels which makes it easier to handle and prevents it from tipping over either during its transportation or when it is being applied or when the straightener is being operated against the side or end of a car.

This counter-balance prevents the truck from being forcibly wedged outwardly when the outer end of the tension arm is raised by the jack.

It is obvious that various changes and modifications may be made in the details of construction and design of the above specifically described embodiment of this invention without departing from the spirit thereof, such changes and modifications being restricted only by the scope of the following claims.

What is claimed is:

1. For use with a car end straightener in which an elongated substantially horizontal tension arm has a forward end adapted to be attached to a fixed part of the car and in which elongated compression arms extend upwardly in divergent relation from the rear end of the tension arm and are constructed at forward ends to engage the car sheet with a jacking head on the rear portion of the tension arm having universal articulation with the rear ends of the compression arms to enable the compression arms to pivot both horizontally and vertically about the jacking head, a truck for transporting and supporting said car end straightener comprising a frame shorter than the elongated tension arm and having a longitudinal central groove to receive said tension arm to center the same upon the truck frame, detent means for holding said tension arm on the truck frame in a particular longitudinal position with the forward portion of the arm projecting in advance of the front end of the frame, an individual holder for each compression arm mounted at forward corner portions of the frame, guides on the frame through which said holders may be individually adjusted in a substantially vertical direction, and individual means on the truck coupled to said respective holders for raising and permitting the lowering of said holders.

2. For use with a car end straightener in which an elongated substantially horizontal tension arm has a forward end adapted to be attached to a fixed part of the car and in which elongted compression arms extend upwardly in divergent relation from the rear end of the tension arm and are constructed at forward ends to engage the car sheet with a jacking head on the rear portion of the tension arm having universal articulation with the rear ends of the compression arms to enable the compression arms to pivot both horizontally and vertically about the jacking head, a truck for transporting and supporting the car end straightener comprising a frame shorter than the elongated tension arm and having a longitudinal groove to receive the tension arm to center the same upon the truck frame, detent means for holding the tension arm on the truck frame in such a longitudinal position that the forward portion of the arm will project in advance of the front end of said frame, an individual holder for each compression arm mounted at the forward portion of the frame, guides on the frame through which said holders are adjustable in a substantially vertical direction, and means on the truck frame coupled to the holders for raising and permitting the lowering of said holders.

3. A truck as claimed in claim 2 in which the detent means comprises a pin and an eye in which the pin is removably fitted.

4. A truck as claimed in claim 2 characterized by the fact that the means for raising the holders comprise winches having chains wound on the winch drums and coupled to lower portions of the holders which project below the guides.

5. A truck as claimed in claim 4 characterized by the fact that the winch drums have ratchet wheels rotatable therewith and pawls adapted to engage the ratchet wheels are movably carried by frames of the winches with the pawls biased to engagement with the teeth of the ratchet wheels.

JOHN D. PRILLIMAN.

REFERENCES CITED

The following references are of record in the file of this patent:

UNITED STATES PATENTS

| Number | Name | Date |
| --- | --- | --- |
| 1,322,941 | Perkins et al. | Nov. 25, 1919 |
| 1,676,263 | Hawkins | July 10, 1928 |
| 1,749,806 | Fisher | Mar. 11, 1930 |
| 2,000,572 | Smith | May 7, 1935 |
| 2,198,434 | Fried | Apr. 23, 1940 |
| 2,371,659 | Stultz | Mar. 20, 1945 |